United States Patent
Takeda

(10) Patent No.: US 7,635,928 B2
(45) Date of Patent: Dec. 22, 2009

(54) DRIVE CONTROL CIRCUIT AND PROJECTION APPARATUS

(75) Inventor: Masaya Takeda, Osaka (JP)

(73) Assignee: Funai Electric Co., Ltd, Osaka (JP)

( * ) Notice: Subject to any disclaimer, the term of this patent is extended or adjusted under 35 U.S.C. 154(b) by 87 days.

(21) Appl. No.: 11/902,059

(22) Filed: Sep. 18, 2007

(65) Prior Publication Data

US 2008/0067870 A1   Mar. 20, 2008

(30) Foreign Application Priority Data

Sep. 19, 2006   (JP) .............................. 2006-252175

(51) Int. Cl.
*H01F 27/42* (2006.01)
(52) U.S. Cl. ..................................... 307/412
(58) Field of Classification Search ................. 307/134, 307/412
See application file for complete search history.

(56) References Cited

U.S. PATENT DOCUMENTS 6,813,662 B2 * 11/2004 Park ............................ 710/74

2007/0252439 A1 * 11/2007 Menas et al. .................. 307/38

FOREIGN PATENT DOCUMENTS

JP    A-2005-076993    3/2005

* cited by examiner

*Primary Examiner*—Robert L. Deberadinis
(74) *Attorney, Agent, or Firm*—Morgan Lewis & Bockius LLP

(57) ABSTRACT

A drive control circuit (100) performs drive control of a plurality of loads (111, 112) having different operating characteristics. The drive control circuit includes a plurality of connectors (106, 107) for connecting with the plurality of loads, a control portion (101) that supplies drive control signals to the plurality of loads via first electrodes of the plurality of connectors, and a comparing portion (110) that compares certain characteristic values at second electrodes concerning certain characteristics of signals applied to the first electrodes of the plurality of connectors and supplies a result of the comparison to the control portion, so that the drive control signals are decided in accordance with the result of the comparison.

6 Claims, 3 Drawing Sheets

DRIVE CONTROL CIRCUIT AND PROJECTION APPARATUS

This application is based on Japanese Patent Application No. 2006-252175 filed on Sep. 19, 2006, and the contents of which are hereby incorporated by reference.

BACKGROUND OF THE INVENTION

1. Field of the Invention

The present invention relates to a drive control circuit, in particular a drive control circuit for performing drive control of a plurality of loads. The present invention also relates to a projection apparatus equipped with such a drive control circuit.

2. Description of Related Art

A projection apparatus has an optical system made up of a lamp to be a light source, a polarizing beam splitter, a polarizing plate, a liquid crystal panel and the like, an it has a problem of heat generated from the optical system. Therefore, a usual projection apparatus has a fan for cooling the entire optical system by letting air in the apparatus flow, and a drive control circuit for performing drive control of the fan, in order to deal with the generated heat.

Recently, there is widespread a projection apparatus having a plurality of fans and a drive control circuit for performing drive control of the plurality of fans for a purpose of securing a sufficient cooling effect, improving the cooling effect or reducing a noise. FIG. 4 shows an example of a drive control circuit for performing drive control of a plurality of fans provided to a conventional projection apparatus.

FIG. 4 is a block diagram to show a general structure of the drive control circuit 900. The drive control circuit 900 includes a microcomputer 901, a first PWM conversion portion 902, a second PWM conversion portion 903, a first driver 904, a second driver 905, a first connector 906, a second connector 907, a first detecting portion 908 and a second detecting portion 909. Here, the first connector 906 is a connector for connecting to a first fan 910, while the second connector 907 is a connector for connecting to a second fan 911.

The microcomputer 901 is connected to the first PWM conversion portion 902 and the second PWM conversion portion 903. The first PWM conversion portion 902 is connected to the first driver 904, while the second PWM conversion portion 903 is connected to the second driver 905, respectively. The first driver 904 is connected to a plus terminal of the first connector 906, while the second driver 905 is connected to a plus terminal of the second connector 907, respectively. In addition, a minus terminal of the first connector 906 is connected to the first detecting portion 908, while a minus terminal of the second connector 907 is connected to the second detecting portion 909, respectively. Furthermore, the first detecting portion 908 and the second detecting portion 909 are connected to a terminal T91 of the microcomputer 901.

In the drive control circuit 900 having the structure described above, the microcomputer 901 delivers a control signal S1 to the first PWM conversion portion 902 for performing drive control of the first fan 910 and delivers a control signal S2 to the second PWM conversion portion 903 for performing drive control of the second fan 911. Furthermore, the first PWM conversion portion 902 performs PWM conversion on the control signal S1 and delivers an obtained signal to the first driver 904. In addition, the second PWM conversion portion 903 performs PWM conversion on the control signal S2 and delivers an obtained signal to the second driver 905.

The first driver 904 delivers a drive control signal to the first fan 910 via the plus terminal of the first connector 906 based on a signal from the first PWM conversion portion 902. In addition, the second driver 905 delivers a drive control signal to the second fan 911 via the plus terminal of the second connector 907 based on a signal from the second PWM conversion portion 903.

The first detecting portion 908 includes an operational amplifier 912 having a non inverting input terminal that is connected to a minus terminal of the first connector 906, an inverting input terminal to which a reference voltage is applied and an output terminal that is connected to the terminal T91 of the microcomputer 901, and a resistor R91 having one end that is connected to the minus terminal of the first connector 906 and the other end that is connected to the ground. In addition, the second detecting portion 909 includes an operational amplifier 913 having a no inverting input terminal that is connected to the minus terminal of the second connector 907, an inverting input terminal to which a reference voltage is applied and a output terminal that is connected to the terminal T91 of the microcomputer 901, and a resistor R92 having one end that is connected to the minus terminal of the second connector 907 and the other end that is connected to the ground.

In this case, if the first fan 910 is not connected to the first connector 906 or if the first driver 904 does not deliver the drive control signal to the first fan 910, no current flows in the minus terminal of the first connector 906. Therefore, the output terminal of the operational amplifier 912 delivers an L-level signal. In addition, if the first fan 910 is connected to first connector 906 and if the first driver 904 delivers the drive control signal to the first fan 910, current flows in the minus terminal of the first connector 906. Therefore, the output terminal of the operational amplifier 912 delivers an H-level signal.

In the same manner, if the second fan 911 is not connected to the second connector 907 or if the second driver 905 does not deliver the drive control signal to the second fan 911, current does not flow in the minus terminal of the second connector 907. Therefore, an L-level signal is delivered from the output terminal of the operational amplifier 913. In addition, if the second fan 911 is connected to the second connector 907 and if a drive control signal is delivered from the second driver 905 to the second fan 911, current flows in the minus terminal of the second connector 907. Therefore, an H-level signal is delivered from the output terminal of the operational amplifier 913.

For this reason, if the signal supplied to the terminal T91 is an L-level signal, the microcomputer 901 detects that the first fan 910 is not connected to the first connector 906, or that the drive control signal is delivered from the first driver 904 to the first fan 910, or that the second fan 911 is connected to the second connector 907, or that the drive control signal is delivered from the second driver 905 to the second fan 911.

In addition, if the signal supplied to the terminal T91 is an H-level signal, the microcomputer 901 detects that the first fan 910 is connected to the first connector 906, and that the drive control signal is delivered from the first driver 904 to the first fan 910, and that the second fan 911 is connected to the second connector 907, and that the drive control signal is delivered from the second driver 905 to the second fan 911.

In the drive control circuit 900 having the structure described above, the microcomputer 901 delivers the control signal S1 for performing drive control of the first fan 910 to the first PWM conversion portion 902, and it delivers the control signal S2 for performing drive control of the second fan 911 to the second PWM conversion portion 903. In this case, there is no problem if the first fan 910 and the second fan 911 has the same operating characteristic and the drive control method is the same between them. However, if the operating characteristic is different between the first fan 910 and the second fan 911, and if the drive control method is also different between them, it is impossible to perform drive control correctly for the first fan 910 and the second fan 911 in the case where the first fan 910 is connected to the second connector 907 and the second fan 911 is connected to the first connector 906, incorrectly.

Therefore, in the drive control circuit 900 the first connector 906 and the second connector 907 have different shapes so as to prevent the first fan 910 from being connected to the second connector 907 and prevent the second fan 911 from being connected to the first connector 906 incorrectly.

In addition, a control unit that can protect the incorrect connection is proposed (see JP-A-2005-076993), which is provided to an air conditioner using a power supply circuit that can delivers voltage generated by a voltage double rectifier from voltage after full wave rectification. It maintains the output voltage from the power supply circuit to be the voltage after the full wave rectification until it recognizes that an indoor unit and an outdoor unit have the same rated power voltage value, so as to protect components when incorrect connection is performed between units having different rated power voltage values.

However, when the drive control circuit 900 shown in FIG. 4 is manufactured, it is necessary to provide different manufacturing steps for the first connector 906 and the second connector 907 because the first connector 906 and the second connector 907 have different shapes. This may cause a problem of lowering production efficiency.

In addition, if the projection apparatus having the drive control circuit 900 shown in FIG. 4 is assembled manually, it is difficult to attach first one of the two connectors that is easier to attach since the first connector 906 and the second connector 907 have different shapes. This may also cause a problem of lowering production efficiency.

The control unit described in JP-A-2005-076993 can only detect incorrect connection due to a difference of the rated power voltage value. Therefore, even if this control unit is applied to the drive control circuit 900 shown in FIG. 4, it is necessary to arrange that the first connector 906 and the second connector 907 have different shapes. Further more, it is still difficult to attach first one of the two connectors that is easier to attach. Therefore, it is difficult to expect improvement of production efficiency.

SUMMARY OF THE INVENTION

In view of the above described problem, it is an object of the present invention to provide a drive control circuit for performing drive control of a plurality of loads with high production efficiency. Further it is another object of the present invention to provide a projection apparatus having such a drive control circuit.

To attain the above described first object, a drive control circuit according to a first aspect of the present invention includes: a plurality of connectors for connecting with a plurality of loads having different operating characteristics; a control portion that supplies drive control signals to the plurality of loads via first electrodes of the plurality of connectors; and a comparing portion that compares certain characteristic values at second electrodes of the plurality of connectors concerning certain characteristics of signals applied to the first electrodes, so that a result of the comparison is supplied to the control portion, and the drive control circuit is characterized by a structure in which the drive control signal is determined in accordance with the result of the comparison.

A drive control circuit according to a second aspect of the present invention, as to the drive control circuit according to the above mentioned first aspect, has a structure in which the certain characteristics of the signals applied to the first electrodes are voltages, the voltages applied to the first electrodes have substantially the same value, and the certain characteristic values at the second electrode is current values.

A drive control circuit according to a third aspect of the present invention, as to the drive control circuit according to the above mentioned first aspect, further includes a detecting portion that detects whether or not current flows in the second electrodes of the plurality of connectors.

A projection apparatus according to a fourth aspect of the present invention is equipped with a drive control circuit according to any one of the above mentioned first to third aspects, and the loads are fans.

A projection apparatus according to a fifth aspect of the present invention is equipped with first and second fans having different voltage and current characteristics, and a drive control circuit. The drive control circuit includes two connectors for connecting with the first and the second fans, a control portion that supplies drive control signals to the first and the second fans via first electrodes of the two connectors, a comparing portion that compares current values at second electrodes of the two connectors, so that a result of the comparison is supplied to the control portion, and a detecting portion that detects whether or not current flows in the second electrodes of the two connectors. The drive control circuit determines which of the first and the second fans is connected to which of the two connectors based on the result of the comparison when substantially the same voltage is applied to the first and the second fans and voltage and current characteristics of the first and the second fans, so as to decide the drive control signals in accordance with a result of the determination.

According to the present invention, it is possible to provide a drive control circuit that can perform drive control correctly of a plurality of loads having different operating characteristics regardless of which of the loads is connected to which of a plurality of connectors. Therefore, it is not necessary to make the plurality of connectors have different shapes. As a result, it is not necessary to provide manufacturing steps of the plurality of connectors separately. In addition, when a certain load is attached manually, it can be attached to any one of unoccupied connectors that is easy to attach. Therefore, production efficiency can be improved.

DETAILED DESCRIPTION OF THE PREFERRED EMBODIMENTS

An embodiment of the present invention will be described with reference to the attached drawings. In the embodiment described below, a plurality of loads having different operating characteristics are different types of fans, and the operating characteristics are the voltage and current characteristics. However, the present invention is not limited to this embodiment, and it can be applied generally to a plurality of loads of any type having any different operating characteristics.

Figure 1:
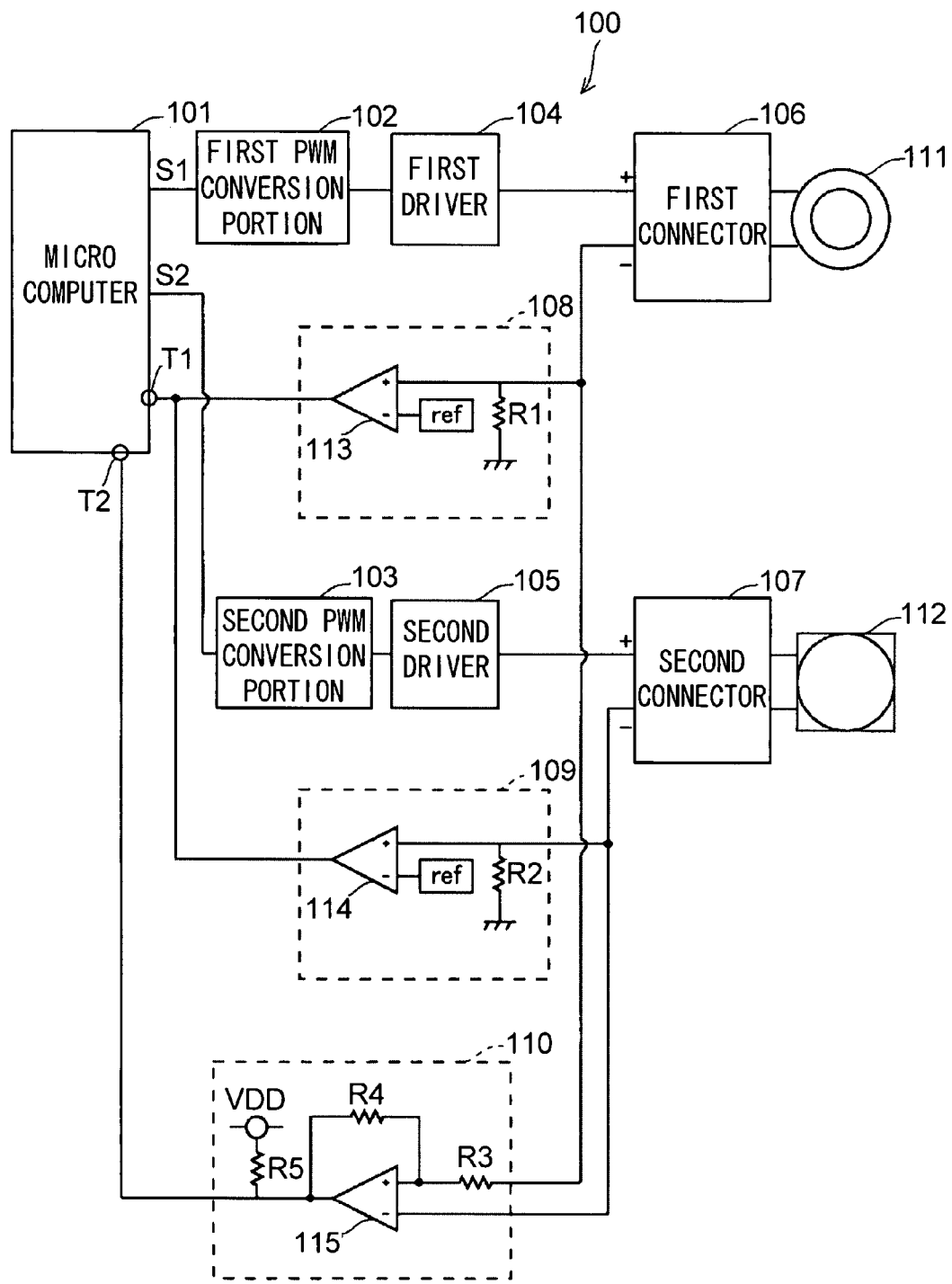
FIG. 1 is a block diagram to show a general structure of a drive control circuit 100 according to the present invention.

FIG. 1 is a block diagram to show a general structure of the drive control circuit 100 according to the embodiment of the present invention. The drive control circuit 100 includes a microcomputer 101, a first PWM conversion portion 102, a second PWM conversion portion 103, a first driver 104, a second driver 105, a first connector 106, a second connector 107, a first detecting portion 108, a second detecting portion 109 and a comparing portion 110. Here, one of the first connector 106 and the second connector 107 is a connector for connecting a first fan 111 as an example of the plurality of loads, and the other is a connector for connecting a second fan 112 as the other example of the plurality of loads.

Although the first fan 111 is connected to the first connector 106, and the second fan 112 is connected to the second connector 107 in FIG. 1, it is possible to connect the second fan 112 to the first connector 106 and to connect the first fan 111 to the second connector 107. Note that the detail of this will be described later.

The microcomputer 101 is connected to the first PWM conversion portion 102 and the second PWM conversion portion 103. The first PWM conversion portion 102 is connected to the first driver 104, while the second PWM conversion portion 103 is connected to the second driver 105. The first driver 104 is connected to the plus terminal of the first connector 106, while the second driver 105 is connected to the plus terminal of the second connector 107. In addition, the minus terminal of the first connector 106 is connected to the first detecting portion 108 and the comparing portion 110, while the minus terminal of the second connector 107 is connected to the second detecting portion 109 and the comparing portion 110. Then, the first detecting portion 108 and the second detecting portion 109 are connected to the terminal T1 of the microcomputer 101, while the comparing portion 110 is connected to the terminal T2 of the microcomputer 101.

In the drive control circuit 100 having the structure described above, the microcomputer 101 supplies the first PWM conversion portion 102 with a control signal S1 for performing drive control of the fan connected to the first connector 106 and supplies the second PWM conversion portion 103 with a control signal S2 for performing drive control of the fan connected to the second connector 107. Then, the first PWM conversion portion 102 performs the PWM conversion on the control signal S1 and delivers the obtained signal to the first driver 104. In addition, the second PWM conversion portion 103 performs the PWM conversion on the control signal S2 and delivers the obtained signal to the second driver 105.

The first driver 104 delivers the drive control signal to the fan connected to the first connector 106 via the plus terminal of the first connector 106 based on the signal from the first PWM conversion portion 102. In addition, the second driver 105 delivers the drive control signal to the fan connected to the second connector 107 via the plus terminal of the second connector 107 based on the signal from the second PWM conversion portion 103.

In other words, the microcomputer 101, the first PWM conversion portion 102, the second PWM conversion portion 103, the first driver 104 and the second driver 105 constitute the control portion that delivers the drive control signal to the fan connected to the first connector 106 via the plus terminal of the first connector 106 and delivers the drive control signal to the fan connected to the second connector 107 via the plus terminal of the second connector 107.

The first detecting portion 108 includes an operational amplifier 113 having a non inverting input terminal connected to the minus terminal of the first connector 106, an inverting input terminal to which a reference voltage is applied, and an output terminal that is connected to the terminal T1 of the microcomputer 101, and a resistor R1 having one end connected to the minus terminal of the first connector 106 and the other end connected to the ground. In addition, the second detecting portion 109 includes an operational amplifier 114 having a non inverting input terminal connected to the minus terminal of the second connector 107, an inverting input terminal to which a reference voltage is applied, and an output terminal that is connected to the terminal T1 of the microcomputer 101, and a resistor R2 having one end connected to the minus terminal of the second connector 107 and the other end connected to the ground. Here, resistance values of the resistor R1 and the resistor R2 are substantially equal to each other.

In this case, if no fan is connected to the first connector 106 or if the first driver 104 does not deliver the drive control signal to the fan connected to the first connector 106, no current flows in the minus terminal of the first connector 106. Therefore, the output terminal of the operational amplifier 113 delivers an L-level signal. In addition, if a fan is connected to the first connector 106 and if first driver 104 delivers the drive control signal to the fan connected to the first connector 106, current flows in the minus terminal of the first connector 106. Therefore, an H-level signal is delivered from the output terminal of the operational amplifier 113.

In the same manner, if no fan is connected to the second connector 107 or if the second driver 105 does not deliver the drive control signal to the fan connected to the second connector 107, current does not flow in the minus terminal of the second connector 107. Therefore, an L-level signal is delivered from the output terminal of the operational amplifier 114. In addition, if a fan is connected to the second connector 107 and if the second driver 105 delivers the drive control signal to the fan connected to the second connector 107, current flows in the minus terminal of the second connector 107. Therefore, an H-level signal is delivered from the output terminal of the operational amplifier 114.

Therefore, if the signal supplied to the terminal T1 is an L-level signal, the microcomputer 101 can detects that no fan is connected to the first connector 106, or that the first driver 104 does not deliver the drive control signal to the fan connected to the first connector 106, or that no fan is connected to the second connector 107, or that the second driver 105 does not deliver the drive control signal to the fan connected to the second connector 107.

In addition, if the signal supplied to the terminal T1 is an H-level signal, the microcomputer 101 can detects that a fan is connected to the first connector 106, and that the first driver 104 delivers the drive control signal to the fan connected to the first connector 106, and that a fan is connected to the second connector 107, and that the second driver 105 delivers the drive control signal to the fan connected to the second connector 107.

The comparing portion 110 includes a resistor R3 having one end connected to the minus terminal of the first connector 106, an operational amplifier 115 having a non inverting input terminal connected to the other end of the resistor R3, an inverting input terminal connected to the minus terminal of the second connector 107 and the output terminal connected to the terminal T2 of the microcomputer 101, a resistor R4 connected between the non inverting input terminal and the output terminal of the operational amplifier 115, and a resistor R5 having one end connected to the output terminal of the operational amplifier 115 and the other end connected to a DC power source VDD.

In this case, the comparing portion 110 compares a current value of current that flows in the minus terminal of the first connector 106 with a current value of current that flows in the minus terminal of the second connector 107 by converting them into voltage values. If a current value of the current that flows in the minus terminal of the first connector 106 is smaller than a current value of the current that flows in the minus terminal of the second connector 107, the comparing portion 110 delivers an L-level signal to the terminal T2 of the microcomputer 101. In addition, if a current value of the current that flows in the minus terminal of the first connector 106 is larger than a current value of the current that flows in the minus terminal of the second connector 107, the comparing portion 110 delivers an H-level signal to the terminal T2 of the microcomputer 101.

Figure 2:
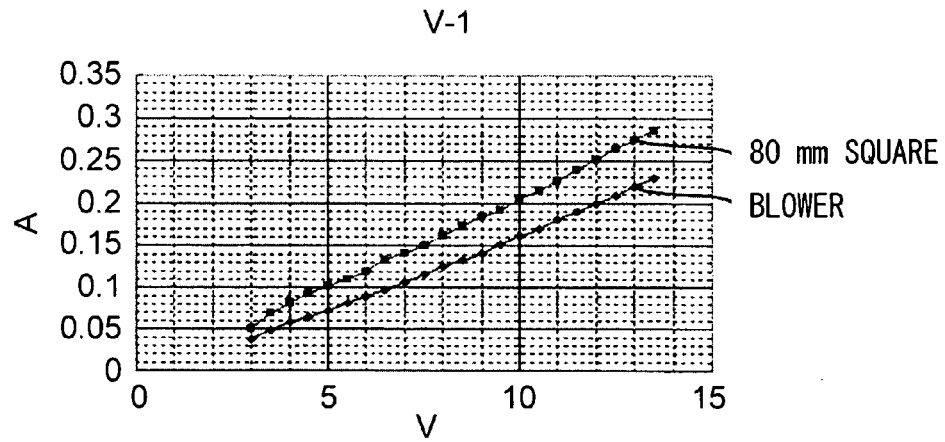
FIG. 2 is a graph to show voltage and current characteristics of an 80 mm square fan and a blower fan used in a conventional projection apparatus.

Here, in a projection apparatus having a plurality of fans, the plurality of fans have different voltage and current characteristics in many cases. FIG. 2 is a graph to show voltage and current characteristics of fans in a conventional projection apparatus having an 80 mm square fan and a blower fan.

If one of the first fan 111 and the second fan 112 is the blower fan having the voltage and current characteristics shown in FIG. 2 and the other is the 80 mm square fan having the voltage and current characteristics shown in FIG. 2, a current value of current that flows in the blower fan is smaller than a current value of current that flows in the 80 mm square fan in the case where a voltage applied to the fan connected to the first connector 106 via the plus terminal of the first connector 106 from the first driver 104 is substantially equal to a voltage applied to the fan connected to the second connector 107 via the plus terminal of the second connector 107 from the second driver 105, as shown clearly in FIG. 2.

For example, the voltage applied to the fan connected to the first connector 106 from the first driver 104 via the plus terminal of the first connector 106 and the voltage applied to the fan connected to the second connector 107 from the second driver 105 via the plus terminal of the second connector 107 are both 10 volts, current that flows in the blower fan is 0.16 amperes while current that flows in the 80 mm square fan is 0.21 amperes, as shown in FIG. 2.

Therefore, if the blower fan is connected to the first connector 106 while the 80 mm square fan is connected to the second connector 107, a signal supplied to the terminal T2 of the microcomputer 101 is an L-level signal. On the contrary, if the blower fan is connected to the second connector 107 while the 80 mm square fan is connected to the first connector 106, a signal supplied to the terminal T2 of the microcomputer 101 is an H-level signal.

Therefore, the microcomputer 101 can determine that the fan connected to the first connector 106 is the blower fan while the fan connected to the second connector 107 is the 80 mm square fan if the signal supplied to the terminal T2 is an L-level signal. In addition, if the signal supplied to the terminal T2 is an H-level signal, the microcomputer 101 can determine that the fan connected to the first connector 106 is the 80 mm square fan while the fan connected to the second connector 107 is the blower fan.

Therefore, if the signal supplied to the terminal T2 is an L-level signal, the microcomputer 101 should make the control signal S1 be the control signal for performing drive control of the blower fan and make the control signal S2 be the control signal for performing drive control of the 80 mm square fan. In addition, if the signal supplied to the terminal T2 is an H-level signal, the microcomputer 101 makes the control signal S1 be the control signal for performing drive control of the 80 mm square fan and makes the control signal S2 be the control signal for performing drive control of the blower fan.

Figure 3:
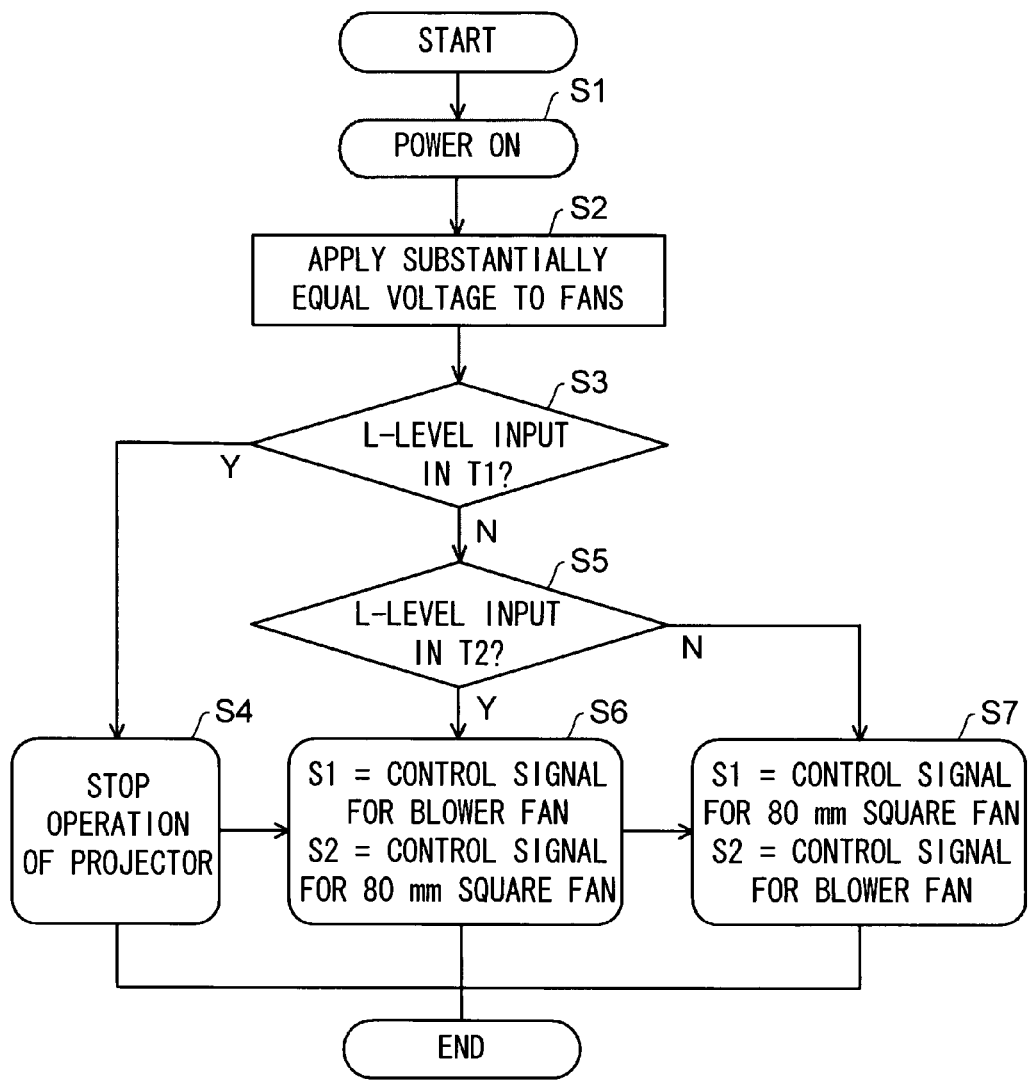
FIG. 3 is a flowchart to show an action of fan determination performed by a microcomputer 101.
Figure 4:
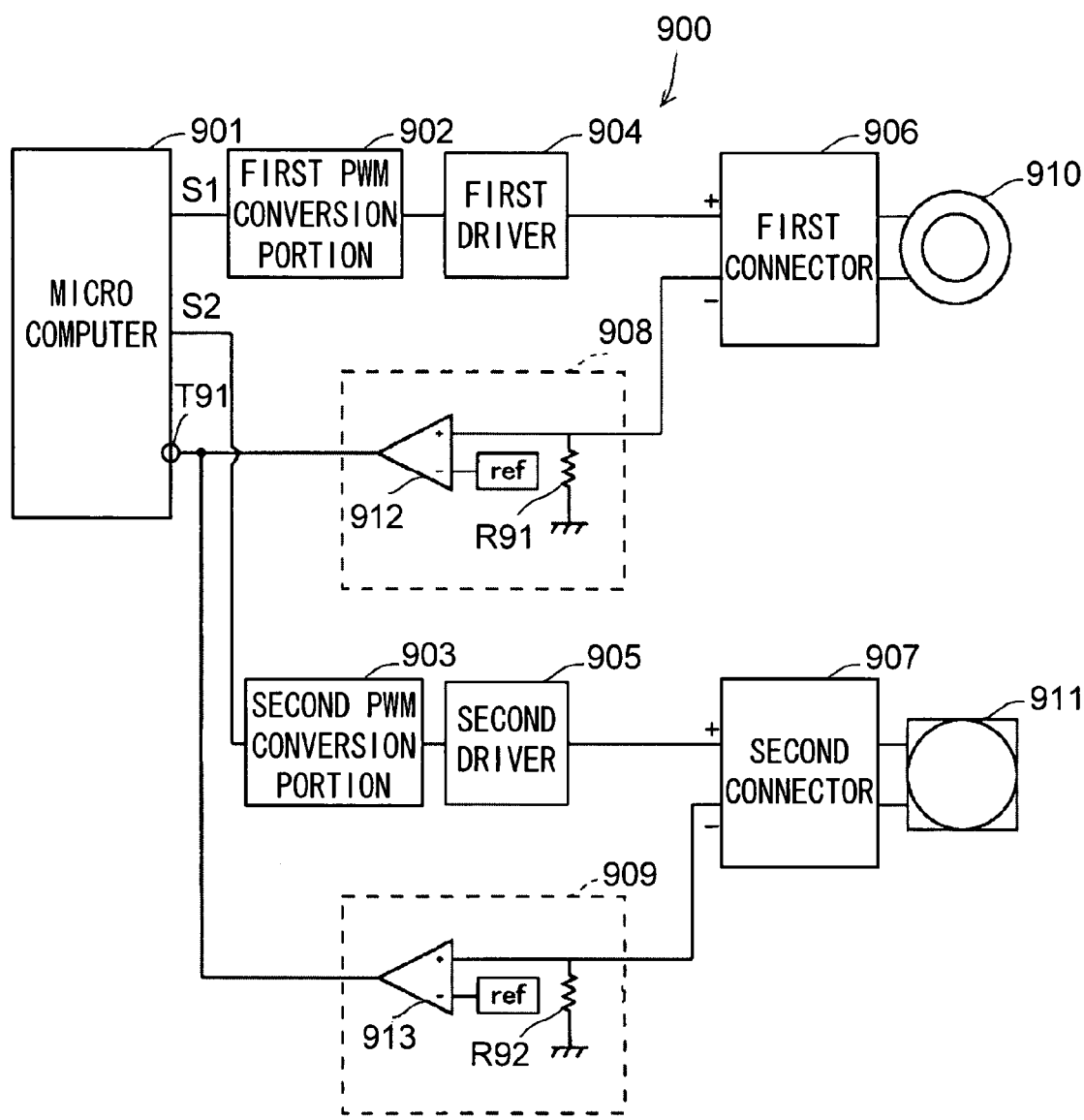
FIG. 4 is a block diagram to show a general structure of a drive control circuit 900 according to a conventional technique.

The above mentioned control procedure of the fan determination performed by the microcomputer 101 will be described more in detail below. FIG. 3 is a flowchart to show the control procedure of fan determination performed by the microcomputer 101. When the projection apparatus is powered on (S1), the microcomputer 101 delivers the control signal S1 and the control signal S2 so that the voltage applied to the fan connected to the first connector 106 from the first driver 104 via the plus terminal of the first connector 106 becomes substantially equal to the voltage applied to the fan connected to the second connector 107 from the second driver 105 via the plus terminal of the second connector 107 (S2).

Then, the microcomputer 101 first detects the signal supplied to the terminal T1 (S3). Here, if the signal supplied to the terminal T1 is an L-level signal, it means that a fan is not connected to at least one of the first connector 106 and the second connector 107. Therefore, the microcomputer 101 stops the operation of the projection apparatus (S4).

In S3, if the signal supplied to the terminal T1 is an H-level signal, the microcomputer 101 detects a signal that is supplied to the terminal T2 next (S5). Here, if the signal supplied to the terminal T2 is an L-level signal, the fan connected to the first connector 106 is the blower fan while the fan connected to the second connector 107 is the 80 mm square fan. Therefore, the microcomputer 101 makes the control signal S1 be the control signal for performing drive control of the blower fan and makes the control signal S2 be the control signal for performing drive control of the 80 mm square fan (S6).

On the other hand, if the signal supplied to the terminal T2 is an H-level signal in S5, the fan connected to the first connector 106 is the 80 mm square fan while the fan connected to the second connector 107 is the blower fan. Therefore, the microcomputer 101 makes the control signal S1 be the control signal for performing drive control of the 80 mm square fan and makes the control signal S2 be the control signal for performing drive control of the blower fan (S7).

Since the microcomputer 101 performs the above mentioned fan determination in the drive control circuit 100 shown in FIG. 1, drive control can be performed correctly by connecting the first fan 111 to one of the first connector 106 and the second connector 107 and the second fan 112 to the other even if the first fan 111 and the second fan 112 have different drive control methods. In other words, drive control can be performed correctly both in the case where the first fan 111 is connected to the first connector 106 while the second fan 112 is connected to the second connector 107 and in the case where the second fan 112 is connected to the first connector 106 while the first fan 111 is connected to the second connector 107.

Therefore, when the drive control circuit 100 shown in FIG. 1 is manufactured, it is not necessary to arrange the first connector 106 and the second connector 107 to have different shapes. Thus, it is not necessary to provide separately the step for manufacturing the first connector 106 and the step for manufacturing the second connector 107, resulting in an improvement of production efficiency.

In addition, when the projection apparatus having the drive control circuit 100 shown in FIG. 1 is assembled manually, one of the first fan 111 and the second fan 112 can be attached first to either one of the first connector 106 and the second connector 107 that is easier to attach. Therefore, production efficiency can be improved.

Note that the present invention is not limited to the embodiment described above, which can be modified variously in the scope of the present invention without deviating from its spirit. For example, it is possible that the number of fans to be driven and controlled by the drive control circuit 100 can be three or more.

The present invention is effective as a drive control circuit for performing drive control of a plurality of loads such as a drive control circuit for performing drive control of a plurality of fans. In addition, the present invention is effective as the projection apparatus having such a drive control circuit.

Although characteristics of the signal to be supplied to the first electrode is exemplified by voltage while a certain characteristic value of the second electrode is exemplified by current in the embodiment described above, these can be any characteristics of the signal to be supplied to the first electrode and any characteristic value generated in the second electrode.

What is claimed is:

1. A drive control circuit comprising:
   a plurality of connectors of the same shape for connecting with a plurality of loads having different operating characteristics, the loads being exchangeable with respect to the connectors;
   a control portion that supplies drive control signals to the plurality of loads via first electrodes of the plurality of connectors; and
   a comparing portion that compares certain characteristic values at second electrodes of the plurality of connectors concerning certain characteristics of signals applied to the first electrodes, so that a result of the comparison is supplied to the control portion, wherein
   the drive control signal is determined in accordance with the result of the comparison.

2. The drive control circuit according to claim 1, wherein the certain characteristics of the signals applied to the first electrodes are voltages, the voltages applied to the first electrodes have substantially the same value, and the certain characteristic values at the second electrode is current values.

3. The drive control circuit according to claim 2, further comprising a detecting portion that detects whether or not current flows in the second electrodes of the plurality of connectors.

4. The drive control circuit according to claim 1, further comprising a detecting portion that detects whether or not current flows in the second electrodes of the plurality of connectors.

5. A projection apparatus equipped with a drive control circuit according to claim 1, wherein the loads are fans.

6. A projection apparatus equipped with first and second fans having different voltage and current characteristics, and a drive control circuit, the drive control circuit comprising:
   two connectors of the same shape for connecting with the first and the second fans, the fans being exchangeable with respect to the connectors;
   a control portion that supplies drive control signals to the first and the second fans via first electrodes of the two connectors;
   a comparing portion that compares current values at second electrodes of the two connectors, so that a result of the comparison is supplied to the control portion; and
   a detecting portion that detects whether or not current flows in the second electrodes of the two connectors, wherein
   the drive control circuit determines which of the first and the second fans is connected to which of the two connectors based on the result of the comparison when substantially the same voltage is applied to the first and the second fans and voltage and current characteristics of the first and the second fans, so as to decide the drive control signals in accordance with a result of the determination.

* * * * *